(12) United States Patent
De Strycker et al.

(10) Patent No.: US 12,522,885 B2
(45) Date of Patent: Jan. 13, 2026

(54) HOT ROLLED STEEL AND A METHOD OF MANUFACTURING THEREOF

(71) Applicant: ArcelorMittal, Luxembourg (LU)

(72) Inventors: Joost De Strycker, Zele (BE); Krista Van Den Bergh, Sint-Gillis-Waas (BE); Xavier Veys, Wilrijk (BE); Lucia Fernandez Macia, Brussels (BE); Ozlem Gungor Ayas, Antwerp (BE); Martin Liebeherr, De Pinte (BE)

(73) Assignee: ArcelorMittal, Luxembourg (LU)

( * ) Notice: Subject to any disclaimer, the term of this patent is extended or adjusted under 35 U.S.C. 154(b) by 879 days.

(21) Appl. No.: 17/285,872

(22) PCT Filed: Oct. 22, 2019

(86) PCT No.: PCT/IB2019/059001
§ 371 (c)(1),
(2) Date: Apr. 15, 2021

(87) PCT Pub. No.: WO2020/084478
PCT Pub. Date: Apr. 30, 2020

(65) Prior Publication Data
US 2021/0348250 A1    Nov. 11, 2021

(30) Foreign Application Priority Data
Oct. 23, 2018    (WO) ................ PCT/IB2018/058255

(51) Int. Cl.
| | | |
|---|---|---|
| *C21D 9/46* | (2006.01) | |
| *C21D 6/00* | (2006.01) | |
| *C21D 8/02* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/42* | (2006.01) | |
| *C22C 38/44* | (2006.01) | |
| *C22C 38/46* | (2006.01) | |
| *C22C 38/48* | (2006.01) | |
| *C22C 38/50* | (2006.01) | |

(52) U.S. Cl.
CPC .............. *C21D 9/46* (2013.01); *C21D 6/004* (2013.01); *C21D 6/005* (2013.01); *C21D 6/008* (2013.01); *C21D 8/0205* (2013.01); *C21D 8/0226* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C21D 2211/002* (2013.01); *C21D 2211/005* (2013.01); *C21D 2211/009* (2013.01)

(58) Field of Classification Search
CPC ..................................................... C22C 38/04
See application file for complete search history.

(56) References Cited

U.S. PATENT DOCUMENTS

| | | | | |
|---|---|---|---|---|
| 2014/0332119 A1* | 11/2014 | Takashima | ........... | C21D 8/0436 148/333 |
| 2021/0123122 A1* | 4/2021 | Yokoyama | .............. | C22C 38/48 |

FOREIGN PATENT DOCUMENTS

| | | |
|---|---|---|
| JP | 2012092379 A | 5/2012 |
| WO | WO 2011/120550 | 10/2011 |
| WO | WO 2014/181534 A1 | 11/2014 |
| WO | WO 2016/092756 A1 | 6/2016 |
| WO | WO-2019187090 A1 * 10/2019 | ........... C21D 8/0205 |

OTHER PUBLICATIONS

See Search Report of PCT/IB2019/059001 dated Nov. 18, 2019.

* cited by examiner

*Primary Examiner* — Jophy S. Koshy
(74) *Attorney, Agent, or Firm* — Davidson Kappel LLC

(57) ABSTRACT

A hot rolled steel having a composition including comprising of the following elements 0.01%≤Carbon≤0.1%, 0.2%≤Manganese≤2%, 0.2%≤Silicon≤1.5%, 0.01%≤Aluminum≤2%, 0.1%≤Tin≤1%, 0.1%≤Copper≤0.5%, 0.001%≤Niobium≤0.1%, 0.002%≤Phosphorus≤0.02%, 0%≤Sulfur≤0.005%, 0%≤Nitrogen≤0.01%, with 0.3%≤Sn+Cu≤1.2% and can contain one or more of the following optional elements 0%≤Titanium≤0.1%, 0%≤Vanadium≤0.1%, 0%≤Chromium≤1%, 0%≤Molybdenum≤0.5%, 0%≤Calcium≤0.01%, 0%≤Boron≤0.01%, 0%≤Magnesium≤0.05%, 0%≤Calcium≤0.01%, 0%≤Cerium≤0.1%, 0%≤Boron≤0.05%, 0%≤ Nickel≤0.01%, the remainder composition being composed of iron and unavoidable impurities caused by processing, the microstructure of said steel sheet including in area fraction, 75% to 95% Ferrite, 1% to 15% Pearlite and optionally Bainite is between 0% and 25% wherein the average grain size of all the microstructural constituent is less than 15 microns.

22 Claims, No Drawings

HOT ROLLED STEEL AND A METHOD OF MANUFACTURING THEREOF

The present invention relates to hot rolled steel and particularly to saline weather resistant steel which is suitable for use as a steel for marine structures, bridges, rail-cars and equipment and structure exposed to a saline environment.

BACKGROUND

EP2553132 is a patent related to a steel product of the weathering steel type, i.e. a product exhibiting increased corrosion resistance after having been exposed to the outside environment for a given time. According to the invention, the steel product is defined by a composition consisting of (in wt %): —Carbon between 0.03 and 0.2, —Manganese between 0.5 and 2, —Copper between 0 and 0.5, —Ti between 0 and 0.1, —Cr between 0 and 0.5, —Nickel between 0 and 0.2, —Niobium between 0 and 0.1, —Nitrogen between 0 and 0.01, —Sulphur between 0 and 0.01, Phosphor between 0 and 0.01, —Aluminium higher than 0 and maximum 1.5, —Silicon between 0.25 and 1.5, the balance being Fe and accidental impurities, and wherein the sum of the Al and Si levels is higher than about 0.85 wt %. But the steel does not mention the tensile strength of the steel nor the corrosion resistance properties.

SUMMARY OF THE INVENTION

The known prior art related to the manufacture of hot rolled steel are inflicted by one or the other lacuna. It is an object of the present invention to provide a hot rolled saline weather resistant steel having strength greater than 450 MPa and a method of manufacturing the same.

The present invention to provides hot-rolled steel sheets that simultaneously have:
- an ultimate tensile strength greater than or equal to 450 MPa and preferably above 470 MPa, or even above 500 MPa,
- Saline weather corrosion resistance of less than 0.55 g/cm2 for 60 cycles of accelerated cyclic corrosion test and preferably less than 0.53 g/cm2 for 60 cycles of accelerated cyclic corrosion test.

In a preferred embodiment, the steel sheet according to the invention may have a yield strength value greater than or above 350 MPa.

Preferably, such steel also has a total elongation of 40% or more.

Preferably, such steel can also have a good suitability for forming, in particular for rolling with good weldability.

Another object of the present invention is also to make available a method for the manufacturing of these sheets that is compatible with conventional industrial applications while being robust towards manufacturing parameters shifts.

Other characteristics and advantages of the invention will become apparent from the following detailed description of the invention.

Carbon is present in the steel of the present invention between 0.01% and 0.1%. Carbon imparts strength to the steel of the present invention by solid solution strengthening, but whenever the amount of carbon increases 0.1% the toughness of the steel reduces. Hence, the preferable limit is between 0.01% and 0.09%.

Manganese is present in the steel of the present invention between 0.2% and 2%. Manganese imparts strength and toughness of the steel of the present invention. Manganese also increases the hardenability of the steel without impairing the weldability of the steel. However, if the amount of manganese is more than 2% it tends to form bainite beyond the acceptable limit, which negatively impacts toughness and ductility. Hence, the preferable limit for the manganese is between 0.4% and 1.9% and more preferably between 0.5% and 1.7%. Manganese also plays an active role in rust formation together with Cu in saline environments, it contributes to the cation selectivity by the co-substitution of $Mn^{2+}$ and $Cu^+$ ions for $Fe^{2+}$ and $Fe^{3+}$, making the rust repellent to the penetration of chloride ions.

Aluminum is present in the steel between 0.01% and 2% and is a ferrite former. Aluminum is an essential element for deoxidation of the steel and an amount of 0.01% is necessary for performing deoxidation. In combination with silicon, the presence of aluminum favors the formation of nanoscale goethite, with a particle size less than 15 nm, in the rust which result in a better corrosion protection. The aluminum content of the steel of the present invention also keeps the grain size less than 15 microns. However, when aluminum content exceeds 2% the toughness of the steel of the present invention is adversely impacted. The preferable limit for aluminum is between 0.01 and 0.9%.

Silicon is present in the steel of the present invention between 0.2% and 1.5%. Silicon imparts strength to steel by solid solution strengthening. Silicon also deoxidizes the steel and to impart strength a minimum amount of 0.2% silicon is required. Particularly in combination with aluminum the presence of silicon promotes the formation of nanoscale goethite, with a particle size less than 15 nm, in the rust, which improve the corrosion resistance, especially in high chloride environments. However, silicon presence above 1.5% reduces the weldability and also impairs the toughness. The preferable limit for Silicon is between 0.2% and 1.4%.

Tin is present in the steel between 0.1% and 1%. Tin imparts corrosion resistance to the steel especially in chloride environment, this corrosion resistance is provided as tin forms $Sn^{2+}$ in the steel and inhibits the formation of $Fe^{3+}$ thereby increasing the corrosion resistance. Further tin also increases the weather corrosion resistance by inhibiting the anodic dissolution reaction especially in a salty chloride environment and to achieve such effect a minimum of 0.1% of tin is mandatory. However, if the content of tin is more that 1% the toughness and the weldability of the steel deteriorate considerably. Hence the preferred limit for tin is between 0.1% and 0.8% and more preferably between 0.1% and 0.6%.

Copper is present in the steel between 0.1% and 0.5%. Copper is an essential element to improve the corrosion resistance of the steel in saline environment copper inhibits the chlorine ions from penetrating into the base metal by changing the base metal ion-selectivity, which inhibits the chlorine ions from penetrating into the base metal, copper also increases the rust density. Hence both effects lead to an increase of the corrosion resistance of the steel and to have these effects a minimum of 0.1% of copper is mandatory. However, when the copper is above 0.5% it impacts the hot ductility of the steel and the toughness of the steel. The preferably limit for Copper is between 0.15% and 0.4%

Tin and Copper cumulatively must be present in the steel between 0.3% and 1.2% to ensure the corrosion resistance of the steel below 0.55 g/cm2 by making available Copper and Tin ions which inhibits the penetration of the Chloride ions into the base metal. When the cumulative amount is less than 0.3% the presence of Ions is deficient and is not able to ensures corrosion resistance of the steel. However, when the presence of Tin and Copper is above 1.2% I it is detrimental for the ductility of the steel.

Niobium is an essential element that is added to the steel between 0.001% and 0.1%. It is suitable for forming carbonitrides to impart strength to the steel according to the invention by precipitation hardening. Due to the fact that niobium delays the recrystallization during hot rolling, the microstructure formed at the end of the manufacturing process is less than 15 microns which impart the requisite mechanical properties to steel of the present invention. But when the niobium content is above 0.1% the amount of carbo-nitrides is not favorable for the present invention as large amount of carbo-nitrides tends to reduce the ductility of the steel.

Phosphorus content of the steel of the present invention is limited to 0.02%. Phosphorus is an element that hardens in solid solution and also interferes with formation of carbides. Therefore, a small amount of phosphorus, of 0.002% can be advantageous, but phosphorus has its adverse effects also, such as a reduction of the spot weldability and the hot ductility, particularly due to its tendency to segregation at the grain boundaries or co-segregation with manganese. For these reasons, its content is preferably limited a maximum of 0.015%.

Sulfur is not an essential element but may be contained as an impurity in steel. The sulfur content is preferably as low as possible, but it is 0.03% or less and preferably at most 0.005%, from the viewpoint of manufacturing cost. Further if higher sulfur is present in steel it combines to form sulfide especially with manganese and titanium reducing their beneficial impact on the present invention.

Nitrogen can be present in the steel of the present invention between 0% and 0.01%. Nitrogen may be added because it refines a structure by forming nitrides with titanium or the like and thus improves toughness of the base metal and the weld heat affected zone. When nitrogen is added less than 0.001%, the effect of refining a structure is not sufficiently provided, and on the other hand, when nitrogen is added more than 0.01%, the amount of dissolved nitrogen is increased, and therefore toughness of the base metal and the weld heat affected zone is degraded.

Titanium is an optional element which may be added to the steel of the present invention between 0% and 0.1%, preferably between 0.001% and 0.1%. As with niobium, it is involved in formation of carbo-nitrides so it plays a role in hardening. But it is also involved in forming TiN that appears during solidification of the cast product. The amount of Ti is so limited to 0.1% to avoid coarse TiN. In case the titanium content is below 0.001% it does not impart any effect on the steel of the present invention.

Vanadium is an optional element which may be added to the steel of the present invention up to 0.1%, preferably between 0.001% and 0.01%. Similar to niobium, it is involved in the formation of carbo-nitrides so it plays a role in hardening. But it is also involved in forming VN that forms during solidification of the cast product. The amount of V is so limited to 0.1% to avoid coarse VN. In case the vanadium content is below 0.001% it does not impart any effect on the steel of the present invention.

Chromium content of the steel of the present invention is between 0% and 1%. Chromium is an element that provides strength and hardening to the steel, but when used above 1% impairs the surface finish of the steel.

Molybdenum is an optional element and can be added up to 0.5% to the steel of the present invention. Molybdenum may enhance the compactness of the rust, impeding the anode dissolution reaction and chloride permeability.

Other elements such as calcium, cerium, boron, magnesium or zirconium can be added individually or in combination in the following proportions: Ca≤0.01% Ce≤0.1%, B≤0.01%, Mg≤0.05%, and Zr≤0.05%. Up to the maximum content levels indicated, these elements make it possible to refine the grain during solidification.

A steel according to the invention does not intend to add Nickel as an alloying element. Nickel has a detrimental effect on the in-use properties especially the corrosion resistance. Still Nickel can be present as a trace element between 0% and 0.01%

The remainder of the composition of the steel consists of iron and inevitable impurities resulting from processing.

The microstructure of the steel according to the invention comprises

75% to 95% of ferrite, 1% to 15% pearlite and an optional bainite between 0% and 25% by area fraction.

Ferrite is the matrix phase of the steel of the present invention and is present between 75% and 95% in the steel. Such ferrite may comprise polygonal ferrite, lath ferrite, acicular ferrite, plate ferrite or epitaxial ferrite. The grain size of the ferrite of the steel of the present invention is less than 15 microns and preferably less than 12 microns. The presence of ferrite in the present invention imparts the ductility. Ferrite forms during the cooling after hot rolling especially between Ar3 temperature and 500° C.

Pearlite is an essential microstructure of the steel of the present invention and present between 1% and 15%. Pearlite imparts strength and toughness to the steel. The grain size for pearlite is less or equal to 15 microns and preferably less than 12 microns. Pearlite is forms during the cooling after hot rolling between Ar3 temperature and 500° C.

Bainite is an optional microstructure of the steel and is contained between 0% and 25%. In the frame of the present invention, bainite consists of lath bainite and granular bainite. Granular bainite, upper bainite and lower bainite. Bainite is formed during the cooling after hot rolling when the cooling rate exceeds 5° C./s and preferably 8° C./s. Bainite imparts strength and toughness to the steel of the present invention.

The total amount of ferrite and pearlite in the present steel is above 90%, this presence imparting the tensile strength to the steel of the present invention. Further the cumulative presence of ferrite and Pearlite above 90% also ensure the average grain size of the steel of the present invention is less than 15 microns and preferably less than 12 microns which in return imparts the steel with corrosion resistance of less than 55 g/cm2 for 60 cycles of accelerated cyclic corrosion test and preferably less than 0.53 g/cm2 for 60 cycles of accelerated cyclic corrosion test.

A steel sheet according to the invention can be produced by any suitable method. A preferred method consists in providing a semi-finished casting of steel with a chemical composition according to the invention. The casting can be done either into ingots or continuously in form of thin slabs or thick slab i.e., with a thickness ranging from approximately 220 mm for slabs up to 400 mm slabs or even through thin slab casting where slab thickness is of range between 40 mm to 400 mm.

For example, a slab will be considered as a semi-finished product. A slab having the above-described chemical composition is manufactured by continuous casting wherein the slab preferably underwent a direct soft reduction during casting to ensure the elimination of central segregation and porosity reduction. The slab provided by continuous casting process can be used directly at a high temperature after the continuous casting or may be first cooled to room temperature and then reheated for hot rolling.

The temperature of the slab which is subjected to hot rolling is at least 1050° C., preferably above 1100° C. and must be below 1250° C. In case the temperature of the slab is lower than 1050° C., excessive load is imposed on a rolling mill, and further, the temperature of the steel may decrease to a ferrite transformation temperature during finishing rolling, whereby the steel will be rolled in a state in which transformed ferrite contained in the structure. Further, the temperature must not be above 1250° C. as there would be a risk of formation of rough austenite grains resulting in coarse austenite grains which decrease the capacity of these grains to re-crystallize during hot rolling. The larger the initial austenite grain size is, the less easily it re-crystallizes, which means that reheat temperatures above 1250° C. must be avoided because they are industrially expensive and unfavorable in terms of the recrystallization of austenite.

The temperature of the slab is preferably sufficiently high so that hot rolling can be completed without putting imposing any excessive load on the rolling mills, hence the finishing hot rolling temperature is always kept above Ar1. It is necessary that the final rolling is performed above Ar1, because below this temperature the steel sheet exhibits a significant drop in rollability. A final rolling temperature is kept above Ar1 and preferably between Ar1 and Ar3+200° C. and more preferably between Ar1 and Ar3+150° C. to have a structure that is favorable to recrystallization and rolling.

The hot rolled steel obtained in this manner is then cooled to at a cooling rate between 1° C./s and 20° C./s to a temperature below 500° C. and preferably below 475° C. The preferable cooling rate after hot rolling is between 1° C./s and 15° C./s and more preferably 1° C./s and 12° C./s. During this cooling the austenite transforms to ferrite, pearlite and bainite. Thereafter the hot rolled steel is cooled to room temperature to obtain a hot rolled steel plate. The final thickness of the plate is usually between 2 mm and 80 mm.

EXAMPLES

The following tests and examples presented herein are non-restricting in nature and must be considered for purposes of illustration only, and they will display the advantageous features of the present invention and expound the significance of the parameters chosen by inventors after extensive experiments and further establish the properties that can be achieved by the steel according to the invention.

Samples of the steel sheets according to the invention and to some comparative grades were prepared with the compositions gathered in table 1 and the processing parameters gathered in table 2. The corresponding microstructures of those steel sheets were gathered in table 3 and the properties in table 4.

Table 1 depicts the steels with the compositions expressed in percentages by weight.

| Steel Samples | C | Mn | Si | Al | Sn | Cu | Nb | P | S | N | Ti | V | Cr | Mo | Ni | Sn + Cu |
|---|---|---|---|---|---|---|---|---|---|---|---|---|---|---|---|---|
| 1 | 0.051 | 1.477 | 0.305 | 0.013 | 0.144 | 0.174 | 0.026 | 0.0035 | 0.0011 | 0.005 | 0.013 | 0.003 | 0.015 | 0.002 | 0 | 0.318 |
| 2 | 0.051 | 1.477 | 0.305 | 0.013 | 0.144 | 0.174 | 0.026 | 0.0035 | 0.0011 | 0.005 | 0.013 | 0.003 | 0.015 | 0.002 | 0 | 0.318 |
| 3 | 0.071 | 0.510 | 1.05 | 0.293 | 0.143 | 0.215 | 0.026 | 0.0032 | 0.0004 | 0.0035 | 0.0144 | | 0 | | 0 | 0.358 |
| 4 | 0.0500 | 1.500 | 0.320 | 0.052 | 0 | 0.175 | 0.027 | 0.0046 | 0.0012 | 0.0025 | 0.014 | 0.003 | 0.017 | 0.002 | 0.288 | 0.175 |
| <u>5</u> | <u>0.15</u> | 1.418 | 0.350 | 0.028 | <u>0.137</u> | <u>0.024</u> | 0.036 | 0.0034 | 0.0011 | 0.0029 | 0.014 | | 0.017 | | <u>0.425</u> | <u>0.161</u> |
| <u>6</u> | <u>0.05</u> | 1.48 | 0.301 | 0.023 | 0.146 | <u>0.010</u> | 0.026 | 0.0026 | 0.0011 | 0.0043 | 0.013 | 0.003 | 0.015 | 0.0023 | <u>0.297</u> | <u>0.156</u> | underlined values: not according to the invention.

Ar1 for the steel of the present invention is between 600° C. and 850° C. and the Ar3 temperature for the steel of the present invention is between 700° C. and 900° C.

Table 2 gathers the process parameters implemented on steels of Table 1 and Table 2 also shows Ar1 and Ar3 temperatures for all the steel Samples.

TABLE 2 process parameters of the trials:

| Steel Sample | Trials | Reheating (° C.) | Rolling reduction in finishing | HR Finish (° C.) | average Cooling speed (° C./s) | Cooling stop (° C.) | Final Thickness (mm) | Ar1 (° C.) | Ar3 (° C.) |
|---|---|---|---|---|---|---|---|---|---|
| 1 | I1 | 1200 | 2.5 | 838 | 2 | Room Temperature | 20 | 677 | 750 |
| 2 | I2 | 1200 | 2.5 | 778 | 11 | 450* | 20 | 677 | 750 |
| 3 | I3 | 1200 | 2.5 | 981 | 2 | Room Temperature | 20 | 844 | 892 |
| 4 | R1 | 1200 | 2.5 | 799 | 2 | Room Temperature | 20 | 581 | 714 |
| 5 | R2 | 1200 | 2.5 | 798 | 2 | Room Temperature | 20 | 484 | 737 |
| 6 | R3 | 1200 | 2.5 | 777 | 2 | Room Temperature | 20 | 597 | 772 |

*Denotes that the steel of trial I2 is fist cooled to a temperature below 500° C. and then to room temperature.
I = according to the invention;
R = reference; underlined values: not according to the invention.
underlined values: not according to the invention.

Table 3 gathers the results of test conducted in accordance of standards on different microscopes such as Scanning Electron Microscope for determining microstructural composition of both the inventive steel and reference trials.

TABLE 3 microstructures of the trials

| Steel Sample | Trials | Ferrite | Pearlite | Bainite | Average Grain size |
|---|---|---|---|---|---|
| 1 | I1 | 92 | 8 | 0 | 11.4 |
| 2 | I2 | 90 | 2 | 8 | 12 |
| 3 | I3 | 95 | 5 | 0 | 9.9 |
| 4 | R1 | 95 | 5 | 0 | 11.9 |
| 5 | R2 | 81 | 19 | 0 | 11.8 |
| 6 | R3 | 93 | 7 | 0 | 11.4 | underlined values: not according to the invention.

Table 4 gathers the mechanical properties of both the inventive steel and reference steel. The tensile strength test is conducted in accordance with JIS Z2241 standards. For the saline weather corrosion resistance the test is conducted according to the modified version of the SAE J2334 standard test with modified spray salt composition: 6 h at 100% RH, 50° C.; 15 min spray with 5% NaCl+0.1% $CaCl_2$); 17.75 h at 50% RH, at 60° C.

TABLE 4 mechanical properties of the trials

| Steel Sample | Trials | Tensile Strength (in MPa) | Corrosion resistance @ 60 cycles (in g/cm2) |
|---|---|---|---|
| 1 | I1 | 474.5 | 0.52 |
| 2 | I2 | 524.5 | 0.52 |
| 3 | I3 | 487 | 0.41 |
| 4 | R1 | 479.5 | 0.63 |
| 5 | R2 | 596.5 | 0.67 |
| 6 | R3 | 490 | 0.70 |

I = according to the invention; R = reference; underlined values: not according to the invention.
underlined values: not according to the invention.

The examples show that the steel sheets according to the invention are the only one to show all the targeted properties thanks to their specific composition and microstructures.

The invention claimed is:

1. A hot rolled steel having a composition expressed in percentage by weight comprising the following elements:
   0.01%≤Carbon≤0.1%
   0.2%≤Manganese≤2%
   0.2%≤Silicon≤1.5%
   0.01%≤Aluminum≤2%
   0.143%≤Tin≤1%
   0.1%≤Copper≤0.5%
   0.001%≤Niobium≤0.1%
   0.002%≤Phosphorus≤0.02%
   0%≤Sulfur≤0.005%
   0%≤Nitrogen≤0.01%
   with 0.3%≤Sn+Cu≤1.2% and optionally containing one or more of the following elements:
   0%≤Titanium≤0.1%
   0%≤Vanadium≤0.1%
   0%≤Chromium≤1%
   0%≤Molybdenum≤0.5%
   0%≤Calcium≤0.01%
   0%≤Boron≤0.01%
   0%≤Magnesium≤0.05%
   0%≤Calcium≤0.01%
   0%≤Cerium≤0.1%
   0%≤Boron≤0.05%
   0%≤Nickel≤0.01%
   a remainder composition being composed of iron and unavoidable impurities caused by processing, a microstructure of the hot rolled steel consisting in area fraction, 75% to 95% Ferrite, 1% to 15% Pearlite and optionally Bainite between 0% and 25%, wherein an average grain size of all microstructural constituents is less than 15 microns.

2. The hot rolled steel as recited in claim 1 wherein the composition by weight includes 0.01% to 0.09% of Carbon.

3. The hot rolled steel as recited in claim 1 wherein the composition by weight includes 0.4% to 1.9% of Manganese.

4. The hot rolled steel as recited in claim 1 wherein the composition by weight includes 0.2% to 1.4% of Silicon.

5. The hot rolled steel as recited in claim 1 wherein the composition includes 0.01% to 0.9% of Aluminum.

6. The hot rolled steel as recited in claim 1 wherein the average grain size is less than 12 microns and a cumulated amount of Ferrite and Pearlite by area fraction is 90% or more.

7. The hot rolled steel as recited in claim 1 wherein the hot rolled steel has tensile strength of 450 MPa or more, and a corrosion resistance of less than 0.55 grams/cm2 per 60 cycles.

8. The hot rolled steel as recited in claim 1 wherein the composition by weight includes 0.143% to 0.8% of Tin.

9. The hot rolled steel as recited in claim 1 wherein the steel is a steel sheet having tensile strength of 470 MPa or more.

10. The hot rolled steel as recited in claim 1 wherein the steel is a steel sheet having tensile strength above 500 MPa, and a corrosion resistance of less than 0.52 grams/cm2 per 60 cycles.

11. The hot rolled steel as recited in claim 1 wherein the microstructure consists of Ferrite, Pearlite and Bainite.

12. The hot rolled steel as recited in claim 2 wherein the composition by weight includes 0.15% to 0.4% of Copper.

13. The hot rolled steel as recited in claim 7 wherein the hot rolled steel has tensile strength of 470 MPa or more and a corrosion resistance of less 0.53 grams/cm2 per 60 cycles.

14. The hot rolled steel as recited in claim 9 wherein the tensile strength is above 500 MPa.

15. A method of production of a hot rolled steel comprising the following successive steps:
   providing a semi-finished product with a steel composition expressed in percentage by weight comprising the following elements:
   0.01%≤Carbon≤0.1%
   0.2%≤Manganese≤2%
   0.2%≤Silicon≤1.5%
   0.01%≤Aluminum≤2%
   0.143%≤Tin≤1%
   0.1%≤Copper≤0.5%
   0.001%≤Niobium≤0.1%
   0.002%≤Phosphorus≤0.02%
   0%≤Sulfur≤0.005%
   0%≤Nitrogen≤0.01%
   with 0.3%≤Sn+Cu≤1.2% and optionally containing one or more of the following elements:
   0%≤Titanium≤0.1%
   0%≤Vanadium≤0.1%
   0%≤Chromium≤1%
   0%≤Molybdenum≤0.5%

0% ≤ Calcium ≤ 0.01%
0% ≤ Boron ≤ 0.01%
0% ≤ Magnesium ≤ 0.05%
0% ≤ Calcium ≤ 0.01%
0% ≤ Cerium ≤ 0.1%
0% ≤ Boron ≤ 0.05%
0% ≤ Nickel ≤ 0.01% a remainder composition being composed of iron and unavoidable impurities caused by processing;

reheating the semi-finished product to a reheating temperature between 1050° C. and 1250° C.;

hot rolling the semi-finished product, a finishing temperature of the hot rolling being above Ar1, to obtain the hot rolled steel;

then cooling the hot rolled steel at a cooling rate between 1° C./s and 20° C./s to a cooling temperature below 500° C.; and cooling the hot rolled steel to room temperature to obtain a hot rolled steel plate.

16. The method as recited in claim 15 wherein, in the step of reheating the semi-finished product, the reheating temperature is between 1100° C. and 1250° C.

17. The method as recited in claim 15 wherein, in the step of hot rolling the semi-finished product, the finishing temperature is between Ar1 and Ar3+200° C.

18. The method as recited in claim 15 wherein, in the step of hot rolling the semi-finished product, the finishing temperature is between Ar1 and Ar3+150° C.

19. The method as recited in claim 15 wherein, in the step of cooling the hot rolled steel at a cooling rate, the cooling temperature is below 475° C.

20. The method as recited in claim 15 wherein, in the step of cooling the hot rolled steel at a cooling rate, the cooling rate is between 1° C./s and 15° C./s.

21. The method as recited in claim 15 wherein, in the step of cooling the hot rolled steel at a cooling rate, the cooling rate is between 1° C./s and 12° C./s.

22. The method as recited in claim 15 wherein a final thickness of the hot rolled steel plate is between 2 mm and 80 mm.

* * * * *